(12) United States Patent
Wattenberg

(10) Patent No.: US 6,583,794 B1
(45) Date of Patent: Jun. 24, 2003

(54) INTERFACE SYSTEM FOR INFORMATION MAPPING

(75) Inventor: Martin Wattenberg, New York, NY (US)

(73) Assignee: Smart Money, New York, NY (US)

( * ) Notice: Subject to any disclaimer, the term of this patent is extended or adjusted under 35 U.S.C. 154(b) by 0 days.

(21) Appl. No.: 09/346,465

(22) Filed: Jul. 1, 1999

(51) Int. Cl.$^7$ .................................................. G06F 3/00
(52) U.S. Cl. ......................... 345/708; 707/102; 345/810
(58) Field of Search ................................. 345/326, 333, 345/335, 356, 357, 339, 346, 440, 437, 708, 705, 744, 765, 839, 810; 705/35, 36, 37; 707/100, 102, 104

(56) References Cited

U.S. PATENT DOCUMENTS

| | | |
|---|---|---|
| 4,860,204 A | 8/1989 | Gendron et al. |
| 5,136,690 A | 8/1992 | Becker et al. |
| 5,191,646 A | 3/1993 | Naito |
| 5,276,789 A | 1/1994 | Besaw |
| 5,323,314 A | 6/1994 | Baber et al. |
| 5,339,393 A | 8/1994 | Duffy et al. |
| 5,414,838 A | 5/1995 | Kolton et al. |
| 5,428,554 A | 6/1995 | Laskoski |
| 5,446,838 A | 8/1995 | Kimelman |
| 5,581,797 A * | 12/1996 | Baker et al. ................. 345/326 |
| 5,590,250 A | 12/1996 | Lamping et al. |
| 5,627,979 A | 5/1997 | Chang et al. |
| 5,644,740 A | 7/1997 | Kiuchi |
| 5,737,533 A | 4/1998 | de Hodn |
| 5,737,556 A | 4/1998 | Yasunaga |
| 5,761,656 A | 6/1998 | Ben-Shakar |
| 5,781,904 A | 7/1998 | Oren et al. |
| 5,787,402 A | 7/1998 | Potter |
| 5,790,121 A | 8/1998 | Sklar et al. |
| 5,805,444 A | 9/1998 | Saymour |
| 5,809,483 A * | 9/1998 | Broka et al. .................. 705/37 |
| 5,819,285 A * | 10/1998 | Damico et al. .............. 707/104 |
| 5,986,673 A * | 11/1999 | Martz ......................... 345/437 |
| 5,987,469 A | 11/1999 | Lewis et al. |
| 6,018,730 A | 1/2000 | Nichols |
| 6,078,901 A | 6/2000 | Ching |
| 6,112,188 A | 8/2000 | Hartnett |

OTHER PUBLICATIONS

ACM Transactions on Graphics, vol. 11, 1 (Jan. 1992) 92–99.
Treemaps: a space–filing approach to the visualization of hierarchical information structure, proc. of the2nd International IEEE Visualization conference (San Diego, Oct. 1991) 284–291. Also Sparks of Innovation in Human–Computer Interaction, Shneiderman, B., Ed., Ablex (Jun. 1993) 309–322.
Hypermedia Exploration with Interactive Dynamic Maps by Mountaz Zizi and Michael Beaudouin–Lafon—International Journal on Human Computer Studies—Special Issue on Knowledge Hypermedia—vol. 43–1995.

* cited by examiner

Primary Examiner—Cao (Kevin) Nguyen
(74) Attorney, Agent, or Firm—Sofer & Haroun, LLP

(57) ABSTRACT

A computer interface system for providing a visual display of a financial market comprising a plurality of display sectors, each display sector representing a financial sector, and the size of each display sector corresponding to a specified characteristic of the financial sector. Furthermore, a plurality of company regions are disposed within each display sector, each company region representing a company, and each of the company regions associated with a financial sector represented by the display sector. The size of each company region corresponds to a specified characteristic of said company region. In one embodiment the specified characteristic may be market capitalization. The display sectors may be further divided into a plurality of industry regions, wherein each industry region corresponds to an industry within the financial sector represented by the corresponding display sector. Each company region may be represented by a color corresponding to a characteristic of the corresponding company, such as market performance. Also, a user may manipulate the visual display by zooming in and out of display sectors and industry regions. Additional commands and buttons may also be provided to further provide means for manipulation the visual display and for providing information to a user. It is understood that the computer interface system may be modified to provide an alternative visual display other than one for a financial market.

40 Claims, 10 Drawing Sheets

STAGE ONE

STAGE TWO

FIG. 7A
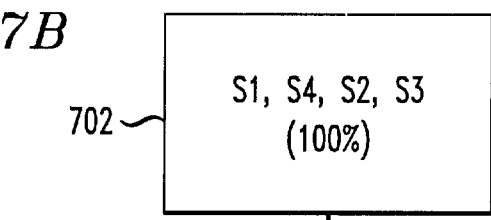
FIG. 7B
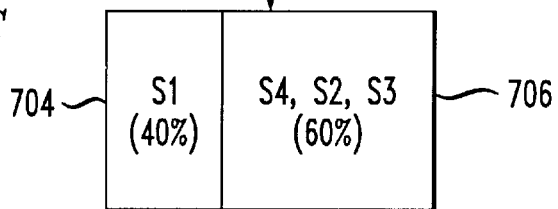
FIG. 7C
FIG. 7D
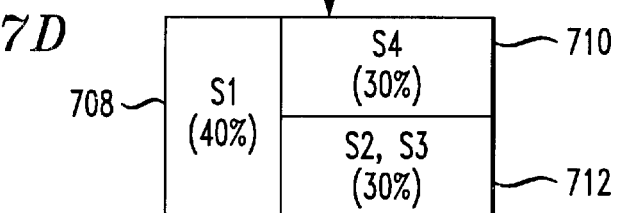
FIG. 7E
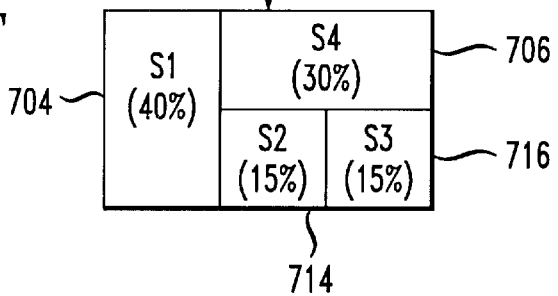

Stock Snapshot

MICROSOFT CORP.    MSFT
162.75 − 2.123    Exchange: NASDAQ    DJIA=9363.46 − 186.150

| PERFORMANCE | ESSENTIALS | NEWS | EARNINGS | RECOMMENDATIONS | FINANCIALS |

ESSENTIALS

| | | | |
|---|---|---|---|
| Last Sale | 162.75 | Net Change | 2,125 | Percent Change | 1,323 |
| Tick | + | Open: | 162.75 | High | 163.88 |
| Volume | 15,091,500 | Previous Close | 160.63 | Low | 160.38 |
| Earnings Per Share | 2.350 | Company Profile | | | |
| PE Ratio | 69.255 | MICROSOFT CORP. develops, manufactures, licenses, sells, and supports a wide range of software products, including operating systems for personal computers and servers, server applications for client/server environments, business and consumer productivity applications, interactive media programs; and internet platform and development tools. Co. also offers online services, sells personal computer books and input devices, and researches and develops advanced technology software products. |
| 52-Week High | 175.93 |
| 52-Week Low | 76.43 |
| Dividend Amount | 0.000 |
| Dividend Frequency | Not Available |
| Yield | 0.000 |
| Shares Outstanding | 2,493,667,000 |

Quotes may be delayed by at least 20 minutes

Stock Search
- ⦿ Stock Snapshot (Enter Symbol)
- ○ Stock Lookup (Enter Name)
- ○ News Search (Enter Symbol)

[Submit]

Mutual Fund Search
- ⦿ Fund Lookup (Enter Name)
- ○ Fund Snapshot (Enter Symbol)

[Submit]

1000

INTERFACE SYSTEM FOR INFORMATION MAPPING

FIELD OF THE INVENTION

This invention relates to information visualization, and more particularly, to a method of breaking up and displaying financial information represented by rectangular regions on a computer interface.

BACKGROUND OF THE INVENTION

Millions of individual investors and securities professionals spend countless hours each year analyzing the performance and fluctuation, among other things, of various financial instruments. In order to gauge more accurately the value of a particular stock, for example, it is often necessary to scrutinize its price, volume and movement against other stocks in the same industry, sector or even across a particular index or market. This process becomes quite tedious, as the accumulation of such continuously changing data is nearly impossible for some and too cumbersome for many others. Even those who manage to collect the desired information then have the hurdle of analyzing the data so as to reach a conclusion.

Indeed, many computer programs exist nowadays to help facilitate a simpler approach to financial analysis. Such programs may, for example, provide charts, graphs, financial equations, technical indicators, etc. so that users can see how the various numbers relate. Furthermore, with the advent of the Internet and the proliferation of online brokers and financial web sites, ever more graphical and interactive financial computer programs, that are best suited to operate in such environments, are becoming available. As these programs are considered a fairly new area of development, there are not surprisingly, many shortcomings in the present technology.

On a similar note, graphical programs relating to other areas on the Internet are, on the whole, nonexistent. For example, this absence is quite noticeable with respect to commerce on the Internet. So far, Internet commerce has had most of its success with the sale of items that require the least physical examination. People are more comfortable ordering products such as books, videos, audio CDS and computer components, where there is little or no mystery as to the substance of the ordered item. Although physical examination is not necessary, customers still desire graphical images of the product and sufficient information to be able to analyze, compare, and chose between related or competing products. Other than individually viewing each product there are few methods of making such a comparison.

One prior art system used by many on-line computer retailers enables users to select two or more products for a comparison review. Such a review typically charts the respective products, listing the presence or absence of features for each one. The limitations of this system are twofold. First, not more than a handful of products may be simultaneously compared due to a lack of viewing space. Second, there is no significant visual or graphical element; forcing users to spend added time and effort reading and deciphering the relevant data.

Generally, the few prior art graphical programs that do exist, typically those relating to non-Internet applications, have been unsuccessful in their attempt to implement systems where large amounts of data are visible in a graphically appealing manner. Users desire an interface where they can comprehend or decipher as much information as possible solely by examining a graphical display, and little else.

With continued reference to the financial industry, one prior art graphical program has endeavored to display information relating to as many companies simultaneously on the same computer interface as possible. Having such information relating to multiple companies on the same screen provides a more efficient graphical environment for analyzing and comparing them. One such system, referred to as a treemap, is described more fully in Jungmeister, W. and Turo D., *Adapting Treemaps to Stock Portfolio Generalization*, Human-Computer Interaction Laboratory, Univ. of Maryland, College Park, Md., Sept., 1992, CS-TR-2996 and incorporated herein by reference. Briefly, the visual display of a treemap comprises a space that is divided into multiple rectangular regions, whereby each region is assigned to a different company. Despite the ability of treemaps to overcome many shortcomings from other prior art systems, by compressing large amounts of data into a small area, there are still significant shortcomings both in the visual element and the implementation of this technology.

Specifically, treemaps are not visually appealing and are limited in function. This is primarily because the prior art algorithm used to generate the many regions on a treemap is not ideally suited for such an implementation. One result, is that individual regions are often distorted in size or shape and hardly visible, thereby wrecking the effectiveness of the display. Furthermore, the overall appearance of such a display is confusing as the prior art systems produce a 'slice-and-dice' layout, which reduces the user's ability to accurately decipher the graphical information. An example of such a 'slice-and-dice' layout is shown with reference to FIG. 1c, as layout 95. Also, by its very structure, this prior art system is limited in function and use. For example, with further reference to layout 95, the awkward structuring of individual regions make it difficult to evenly zoom into portions of the display without cutting off the very long or wide regions.

Thus, there is a need for a computer program that can provide an interface that simultaneously conveys to the user information on multiple companies or other relevant items. In addition, there is a need for such an interface to be implemented in a graphically appealing and functional manner, where the user can visualize large quantities of graphical information. Naturally, overcoming these shortcomings will prove beneficial to many environments, not solely on the Internet and not exclusively to the financial industry.

OBJECT AND SUMMARY OF THE INVENTION

It is thus a general object of the present invention to provide a computer interface system to graphically visualize information in an efficient manner.

A more specific object of the present invention is to provide a software system and computer interface that enables users to view a large quantity of information on an efficiently configured graphical environment.

The software system according to one embodiment of this invention is configured to operate as a financial software application. According to this embodiment, a computer interface system is provided, which divides a display screen into a plurality of financial sectors from the securities industry, such as Utilities, Basic Materials, Transport, Consumer Staples, Energy, Capital Goods, Communication, Financial, Technology, Health Care and Consumer Cyclicals. In addition, the computer interface system displays a button bar and a menu interface for manipulating and displaying information to the user.

The computer interface system also displays, for each of the financial sectors, a plurality of rectangular regions, each region corresponding to a distinct company or corporation that renders business within that particular financial sector. Such companies typically have stock trading on a securities exchange, such as the New York Stock Exchange (NYSE), the American Stock Exchange (AMEX) and the NASDAQ. Furthermore, each financial sector displayed on the screen is potentially subdivided into multiple units, referred to in this embodiment as industries, wherein the stocks or companies belonging to the same sector are grouped according to shared industries. For example, the Technology sector comprises technology companies such as Microsoft Corp. (MSFT), Intel Corp. (INTC), Cisco Systems (CSCO), Oracle (ORCL), Computer Associates (CA), America Online (AOL) and Advanced Micro Devices (AMD). Microsoft, Oracle and CA may be grouped together in a software industry, a subset of the Technology sector. Further, Intel and AMD may be categorized as part of the semiconductor industry, Cisco as part of the networking industry, and so forth.

It is noted that the computer interface system can be manipulated to provide various zoom views to the user. For example, the interface system may exclusively display on the screen one display sector by enlarging that portion to occupy the entire visual area. Accordingly, the user may select to only view the Technology sector, etc. Further, the interface may be further enlarged to exclusively display a particular unit or industry within each financial sector, such as the software industry. Depending on the preferences of the user he or she may vary the zoom view so as to display a larger or smaller portion of the companies on the financial markets.

According to the present embodiment, the interface system is configured via its various display views, to graphically convey to the user information about individual companies through the use of region size and color. Thus, for each region or company the user can simply examine its graphical size and color to decipher certain relevant information or performance data on the respective company. In one embodiment, the size of a region corresponds to the market capitalization of the company represented by that region and the color corresponds to its recent performance from a predetermined date. For example, the color may indicate a positive or negative price change from the previous market day or from its 12-month low, etc. Correspondingly, green or lighter shading can refer to a positive stock price change and red or darker shading can refer to a negative stock price change. An additional modification, in one embodiment, can be employed to enhance accuracy by, for example, utilizing multiple shades of green and red to indicate greater or lessor price changes and perhaps by also utilizing a third color, such as black, to indicate a neutral performance. It is understood that these visual indications may be modified in numerous ways. For example, the size of a region may refer to trading volume of the company represented by the region, as opposed to market capitalization and the color to a change in its P/E ratio as opposed to a change in stock price, and so forth.

The process or method by which the interface system of this embodiment generates the appropriate rectangular region sizes and positions for display on the computer interface is now explained in more detail. The method of this embodiment operates via two stages: sizing and shaping the rectangles, also referred to as the initial layout stage, and positioning the sized rectangles, also referred to as the optimization stage.

As a preliminary, the underlying objectives of this method are briefly detailed. In essence, simply sizing a rectangular space based on the appropriate criteria, such as market capitalization or volume, would not be sufficient. First, there may be a minority of companies that have significantly larger capitalization or volume compared to the remaining companies that are to be displayed.

Without the unique method of this invention, the significantly larger company may be potentially sized to occupy most of the screen, both dwarfing other companies and impairing the benefits of the visual interface to the user. Therefore, a method for intelligently apportioning regions so that each company is satisfactorily displayed is necessary.

Second, even if the apportionment is perfectly calculated the shape and position of individual regions present two other difficulties. It is most desirable to have each region shaped in a visually appealing manner and to have similarly sized or similarly related regions adjacent to each other. Thus, awkwardly shaped regions, such as long narrow rectangles should be avoided as well as randomly positioned regions, which potentially confuse the user and damage part of the look and value of the interface. The method of creating such regions, according to one embodiment, is detailed below.

Given a rectangular space, such as the display area of the display screen, and a list of display sectors, such as the financial sectors, the method of this embodiment is initiated with the aim of dividing the display area into multiple rectangular display sectors, representing corresponding financial sectors. First, the initial layout stage is employed so that the multiple rectangular sectors are sized appropriately.

Initially, the method of this embodiment creates a sorted list of the provided financial sectors. The list may also contain any accompanying information, such as the individual companies and industries belonging to each of the sectors. In this embodiment, the sectors are sorted according to a predetermined criterion, such as market capitalization, which will be the basis for determining the physical size of each display sector. Thereafter, the total weight W of all the sectors is calculated. Here, total weight refers to the sum total market capitalization for all sectors. As explained above, the size of a display sector according to one embodiment graphically corresponds to its market capitalization. Thus, a larger display sector should represent a financial sector with a larger total capitalization. This concludes the initialization process.

Thereafter, the sorted list of sectors is divided into two sub-lists, wherein the first list is generated by taking as many of the largest sectors that have a total weight not exceeding 50% of weight W. The second list comprises all remaining sectors. In the situation where the largest sector is greater than 50% of weight W, the method of this invention can operate in one of several manners. According to one embodiment, the method of this invention preferably allows the largest sector of the list to occupy its corresponding proportional size on the display screen even if that size exceeds the 50% limitation. According to another embodiment, the method considers, for calculation purposes, as if the largest sector is weighed exactly 50% of weight W. This, in effect, reduces the significance of larger regions on the display in order to avoid visibility problems with smaller regions.

Then, the rectangular sector is taken and broken into two sub-regions, one region for each of the two sector lists. The rectangular sector is divided based on the weight of the first and second lists. Furthermore, according to the aforementioned embodiment that resizes the proportionate area of a large sector on the display screen, if the first sector list comprises a sector weighing more than 50% of the total weight W, the rectangular sector would be divided into two equally sized sub-regions. Thus, the first list would be assigned 50% of the original rectangular region, as well as the second list. This prevents a proportionately larger sector from occupying too much space and dwarfing the size of the remaining sectors. It should be noted that the limit of 50% is a predetermined percentage and may be modified as either a higher or lower percentage limit depending on the desired appearance of the display.

Then, the method of this embodiment determines in what manner to create the two sub-regions. Specifically, the method calculates whether it should divide the original rectangular sector vertically, with a vertical line, or horizontally, with a horizontal line. Basically, the line that provides the lowest aspect ratios for both regions is chosen. The aspect ratio of a region refers to the shape of its rectangular form, based on the ratio of its length to width, or vice versa. Ideally, the sub-region should be shaped as close to a square as possible, thus having the lowest possible aspect ratio of 1:1. This process of continuously dividing the sectors into two groups of low aspect ratio regions provides for a remarkably visually appealing and useful display.

Thereafter, for any sub-region having more than one sector the above steps are repeated. Specifically, a new sorted sector list is generated and the total weight W is recalculated based on the sectors in the present sub-region. Then, the sector list is broken into two sub-lists based on the aforementioned criteria and the present region is further divided into two sub-regions, each being assigned to one of the two sub-lists as detailed above.

Once every sector is assigned to its own sized region, the first stage is complete.

Now, stage two, the optimization stage, is employed so that the sized regions can be rearranged or positioned in their proper locations or layout. It is noted that there is more than one 'proper' location, as the positioning of this stage is not limited to any one specific method. Basically, the method of stage two is primarily configured to eliminate the random positioning of the regions so as to improve the visual appearance and prevent potential user confusion. Thus, the optimization method may be used to arrange the regions by a mathematical function of various characteristics of displayed regions, such as for example, the size of a region, performance of underlying entity represented by the region, volume of the underlying entity represented by the region, etc.

Accordingly, the optimization arrangement provides a further enhancement to the graphical view since the user may also obtain information by simply noting the arrangement or positions of the regions. For example, one optimization method positions regions by performance, thus enabling users to determine the relative performance of a company based on its location on the interface. Aside for the inherent usefulness, this method provides for a more appealing visual display by not randomly dispersing the regions. The optimization method is employed as follows.

Initially, the rectangular regions generated in stage one are taken and arranged in every possible layout. This is purely a mechanical process where every combination of positioning the various regions is generated. This is analogous to a puzzle, wherein each piece, or rectangular region, is placed in every possible location to see where it fits best. According to another embodiment, instead of using a brute force method to find an optimum layout, various sampling algorithms are employed to more efficiently process the optimization stage. For example, such algorithms may include dynamic programming, simulated annealing, and genetic algorithms.

For each of the layouts generated, a mathematical function is employed based on a selected set of characteristics relating to each region. This mathematical function is then optimized to determine the most desired layout among the corresponding group of possible layouts.

As described above, the optimization of this stage is not limited to a particular method. For example, in accordance with one embodiment the mathematical function is derived from the differences between one or more metrics of various entities based on their selected layout. A metric in this context refers to a quantifiable characteristic of an entity represented by a region on the display screen. For example, for a company represented by a region typical metrics may include market capitalization, price increase or price decrease over a given period, price/earning ratio or any other desired metric. The various entities considered by the mathematical function may include each region and all the other regions adjacent to it in each one of the selected layouts. In the alternative a separate function can govern the selection of the regions whose metrics are part of the mathematical function. As such the selected regions may not be adjacent to each other. Some examples of the mathematical function governing an optimized layout are explained below.

According to one embodiment, the variable used by the mathematical function to optimize the layout is a region value. As such, first a region value is assigned to every region or company in the layout. This region value corresponds to a numerical or other comparable value that is derived from the performance of the respective region. For example, a company having a stock price appreciation of 36.3 % for the prior twelve months may be assigned a region value of 36.3. In an alternative embodiment, if the user wishes to employ the optimization method using region size or any other criteria (metric) as opposed to performance, the corresponding region value for each region is simply replaced with the desired value.

Second, for every region in the layout a mathematical function in accordance with one embodiment is defined as the region variance. The region variance is calculated by computing.the difference between each region value of a region and the region values of all its neighboring regions. The region variance calculation is done for every region in the layout and then summed to derive a layout variance number.

Thereafter, the layout having the lowest layout variance number is chosen as the desired layout. In other words, the layout having the most similar regions adjacent to each other is selected.

In another embodiment of the invention, the mathematical function is defined as the sum of distances between adjacent regions. Preferably the distance is defined as the square root of the sum of the squares of differences in price change of an entity represented by a region over some set of time intervals. Thereafter, the layout having the lowest sum of distances between adjacent regions is chosen as the desired layout. This concludes stage two and the method according to this embodiment of the invention The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views:

FIG. 7a is a graphical representation of a sorted sector list, according to one embodiment of the present invention.

FIG. 7b is a graphical representation of one step in the initial layout stage, according to one embodiment of the present invention.

FIG. 7c is a graphical representation of another step in the initial layout stage following the step illustrated in FIG. 7b, according to one embodiment of the present invention.

FIG. 7d is a graphical representation of another step in the initial layout stage following the step illustrated in FIG. 7c, according to one embodiment of the present invention.

FIG. 7e is a graphical representation of another step in the initial layout stage following the step illustrated in FIG. 7d, according to one embodiment of the present invention.

FIG. 8a is a graphical representation of one layout generated during the optimization stage, according to one embodiment of the present invention.

FIG. 8b is a graphical representation of another layout generated during the optimization stage, according to one embodiment of the present invention.

FIG. 8c is a graphical representation of another layout generated during the optimization stage, according to one embodiment of the present invention.

FIG. 8d is a graphical representation of another layout generated during the optimization stage, according to one embodiment of the present invention.

FIG. 10 is a view of a stock snapshot interface, according to one embodiment of the present invention.

DETAILED DESCRIPTION OF THE INVENTION

Figure 1A:
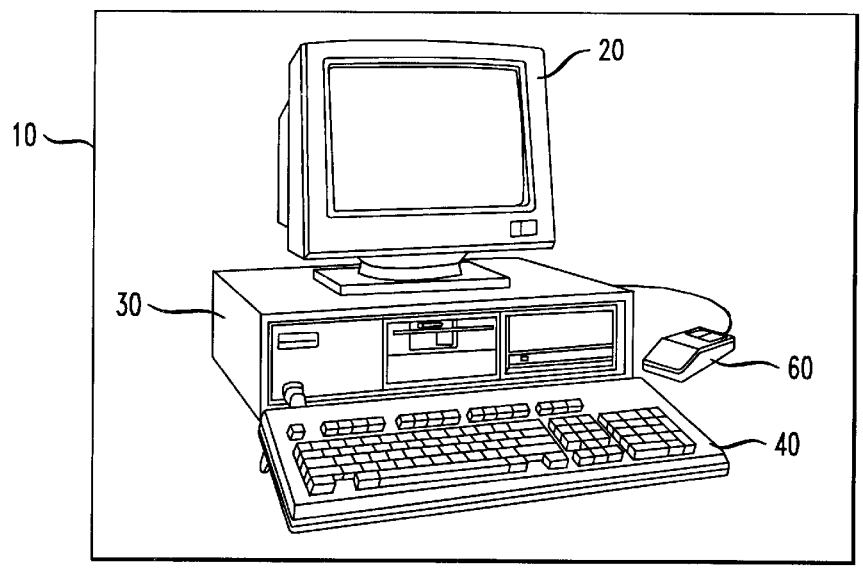
FIG. 1a illustrates the structure of a computer system according to one embodiment of the present invention.
Figure 1B:
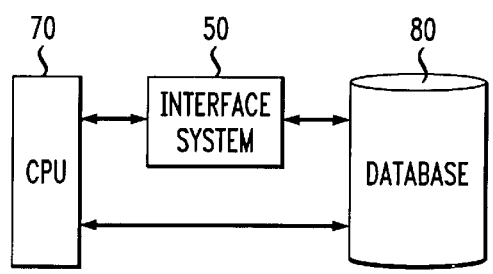
FIG. 1b is a block diagram of the interface system of this invention, according to one embodiment.

With reference to FIGS. 1a and 1b a computer system 10 is shown for enabling the access and use of a financial software interface system 50 (FIG. 1b) according to one embodiment of the invention. Computer system 10 comprises a tower case 30 for housing various system components such as the CPU 70 (FIG. 1b), main board, memory and disk storage (not shown). Furthermore, computer system 10 comprises a display screen 20 so that an application, such as interface system 50, can provide a visual output to the user. Also provided is a keyboard 40 and mouse 60 to provide user input components to the computer system.

Interface system 50, more specifically, is the entire system that leads to the graphical display on display screen 20. This includes the software that originates the display, user interactivity components, as well as any database structure or other tool that provides access to the specific data. With reference to FIG. 1b, interface system 50 is shown with connections to CPU 70 and database 80 for providing processing capabilities and a data source respectively. It is understood that interface system 50 may be alternatively based on a hardware structure, as opposed to software, and that certain external components may additionally be provided to enhance the application. This will be described in more detail below.

Figure 2A:
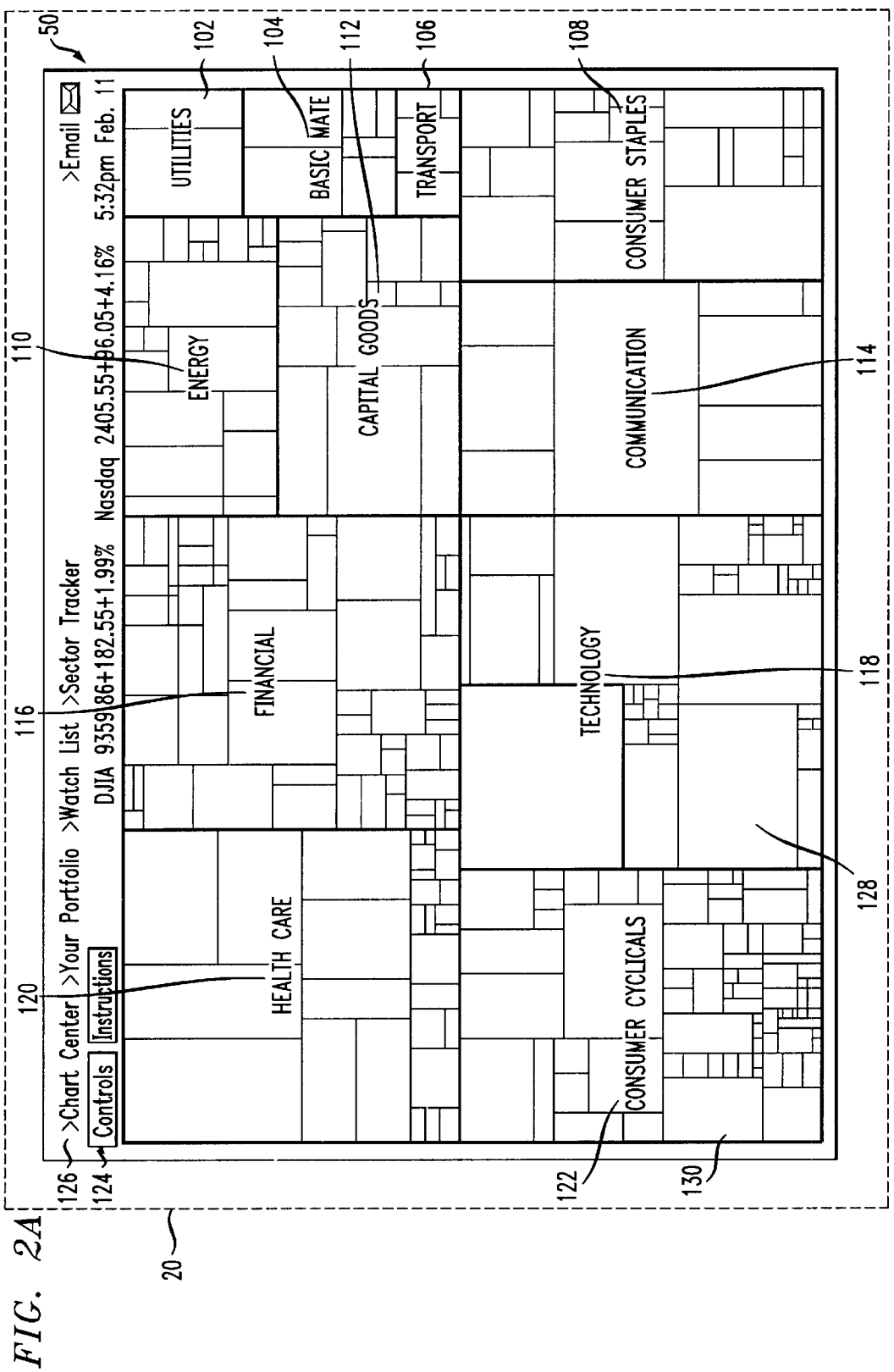
FIG. 2a illustrates a view of a computer interface for a financial software application, according to one embodiment of the invention.

FIG. 2a illustrates a view of display screen 20 as generated by interface system 50, according to one embodiment of the present invention, referred to herein as a market map display. In accordance with one embodiment of the invention, interface system 50 divides the market map display of display screen 20 into, for example, eleven rectangular display sectors 102–122, corresponding to eleven financial sectors from the securities industry. These may include Utilities sector 102, Basic Materials sector 104, Transport sector 106, Consumer Staples sector 108, Energy sector 110, Capital Goods sector 112, Communication sector 114, Financial sector 116, Technology sector 118, Health Care sector 120 and Consumer Cyclicals Sector 122.

In addition, interface system 50 displays on display screen 20 a button bar 124 and a menu interface 126 for manipulating and displaying information to the user. It is noted that the display of interface system 50 is shown according to one embodiment of the present invention and is not limited as such. For example, as will be described in more detail below, the number of display sectors, as well as type, may be modified in numerous ways. Also, there are many alternative applications in addition to that of the financial industry.

FIG. 2a also shows, for each of display sectors 102–122, a plurality of rectangular regions, such as regions 128 and 130, each region corresponding to a distinct object, which in this embodiment refers to a company or corporation within that particular financial sector. Such companies typically have stock trading on a securities exchange, such as the New York Stock Exchange (NYSE), the American Stock Exchange (AMEX) and the NASDAQ. Furthermore, each financial sector is potentially divided into multiple units, referred to in this embodiment as industries, wherein the stocks or companies belonging to the same financial sector are grouped according to shared industries. For example, Technology sector 118 comprises technology companies such as Microsoft Corp. (MSFT), Intel Corp. (INTC), Cisco Systems (CSCO), Oracle (ORCL), Computer Associates (CA), America Online (AOL) and Advanced Micro Devices (AMD). Microsoft, Oracle and CA may be grouped together in the software industry, a subset of the Technology sector. Further, Intel and AMD may be categorized as part of the semiconductor industry, Cisco as part of the networking industry, and so forth.

Figure 2B:
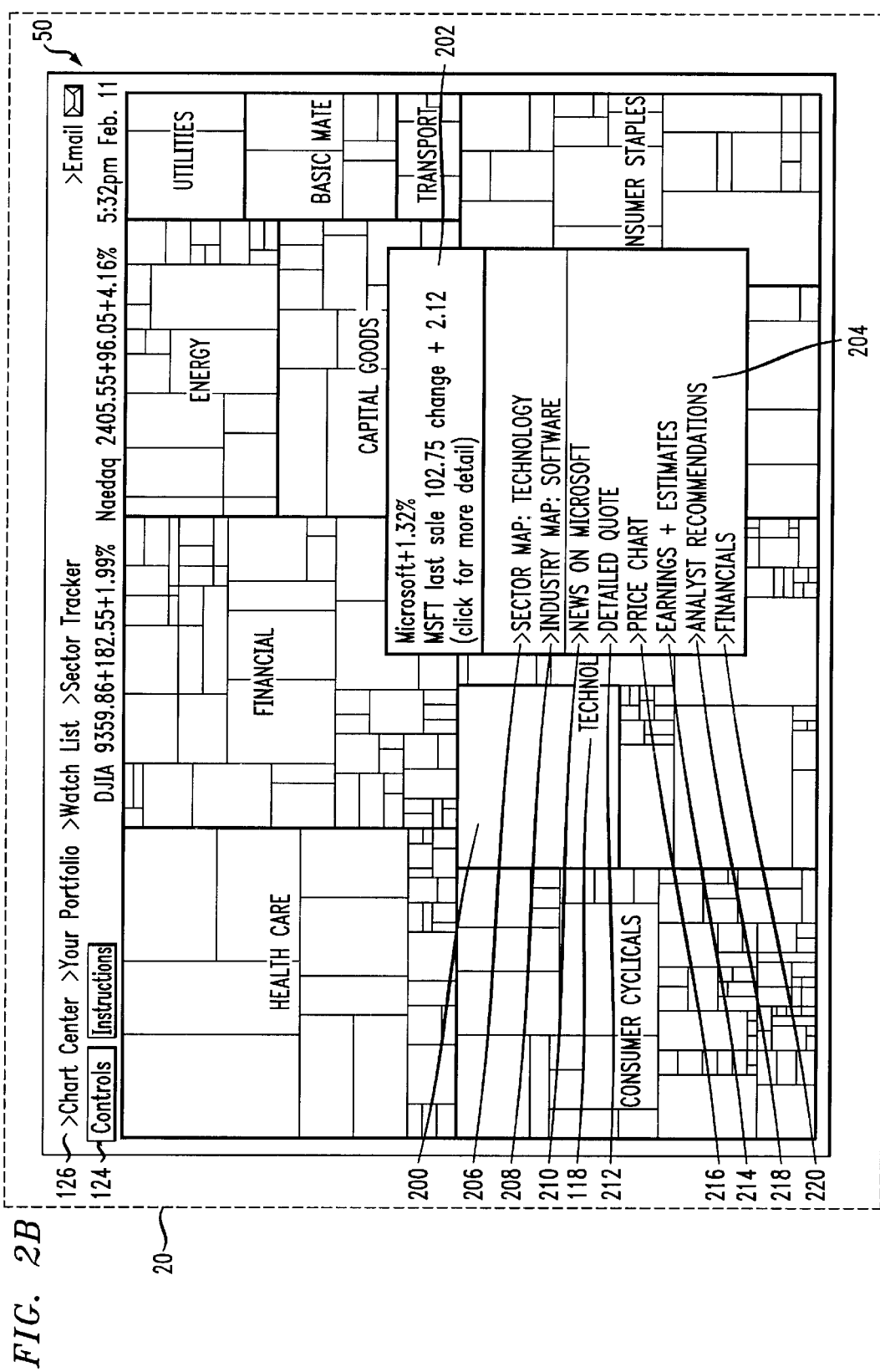
FIG. 2b illustrates a view of a computer interface for a financial software application with a selected region, according to one embodiment of the present invention.

With reference to FIG. 2b, region 200, corresponding to Microsoft Corp., is shown selected. One way of selecting a region is simply to move mouse 60 so that its corresponding mouse pointer on display screen 20 is shown over a portion of the desired region. In response, a selected pop-up display 202 appears, listing the company name, stock symbol, recent price and change since the previous closing price, for example. If the user further employs an input device, such as by clicking the mouse button, expanded display 204 appears, listing more options and/or data on Microsoft Corp. for the user. In a like manner, a user may select any rectangular region on the computer interface and a corresponding pop-up display and/or extended display would appear with information or user options related to the selected company.

According to one embodiment, as shown on FIG. 2b, pop-up display 202 displays three lines of information. The first line provides the company name and percentage change in stock price from the previous trading day. Line two displays the stock symbol, the latest stock price and the change in stock price from the previous trading day. The third line provides an instruction to the user, advising such a user how to display expanded display 204.

Expanded display 204 provides additional information about the selected company, and, offers several options so that the user can further manipulate the computer interface. In this embodiment eight commands are shown, wherein selection of any of these commands returns a new display with the corresponding information. Two of these commands, 'Sector Map: Technology' command 206 and 'Industry Map: Software,' command 208 serve two functions. First, their respective titles inform the user the corresponding sector and industry to which a selected company belongs. For example, here it is shown that Microsoft belongs to the Technology sector and to the Software industry. Second, these commands also facilitate zooming into a respective display view of a sector map display or industry map display, as described in more detail below.

Furthermore, with respect to the remaining commands, selection of 'News' command 210 provides a display comprising news and related information on Microsoft Corp. Selection of 'Detailed quote' command 212 provides a display comprising detailed stock quote information on Microsoft Corp. Selection of 'Price chart' command 214 provides a display comprising a price chart of Microsoft Corp. Selection of 'Earnings estimate' command 216 provides a display comprising earnings and estimates for Microsoft Corp. Selection of 'analyst recommendations' command 218 provides a display comprising analyst recommendations for Microsoft Corp. Finally, selection of 'Financials' command 220 provides a display comprising financial information on Microsoft Corp. Naturally, expanded display 204 may be customized to include any desired command and resulting display. In addition, these commands and the provided information may be different for each selected region.

According to the present embodiment, interface system 50 is configured via its various views, as shown in FIGS. 1–4, to graphically convey to the user information about individual companies through the use of region size and color. Thus, for each region or company the user can simply examine its graphical size and color to decipher certain relevant information or performance data on the respective company. In one embodiment, as shown in FIGS. 1–4, the size of a region corresponds to its market capitalization on a securities exchange and the color corresponds to its recent performance from a predetermined date. For example, the color may indicate a positive or negative price change from the previous market day or from its 12-month low, etc. Correspondingly, green or lighter shading can refer to a positive stock price change and red or darker shading can refer to a negative stock price change. An additional modification, in one embodiment, can be employed to enhance accuracy by, for example, utilizing multiple intensities or shades of green and red to indicate different levels of price changes and perhaps by also utilizing a third color, such as black, to indicate a neutral performance. It is understood that these visual indications may be modified in numerous ways. For example, the size of a region may refer to its trading volume as opposed to market capitalization and the color to a change in its P/E ratio as opposed to a change in stock price, and so forth.

With continued reference to the embodiment as shown in FIGS. 1–4, it is understood that many additional features can be added to the interface and function of the financial application.

Figure 3:
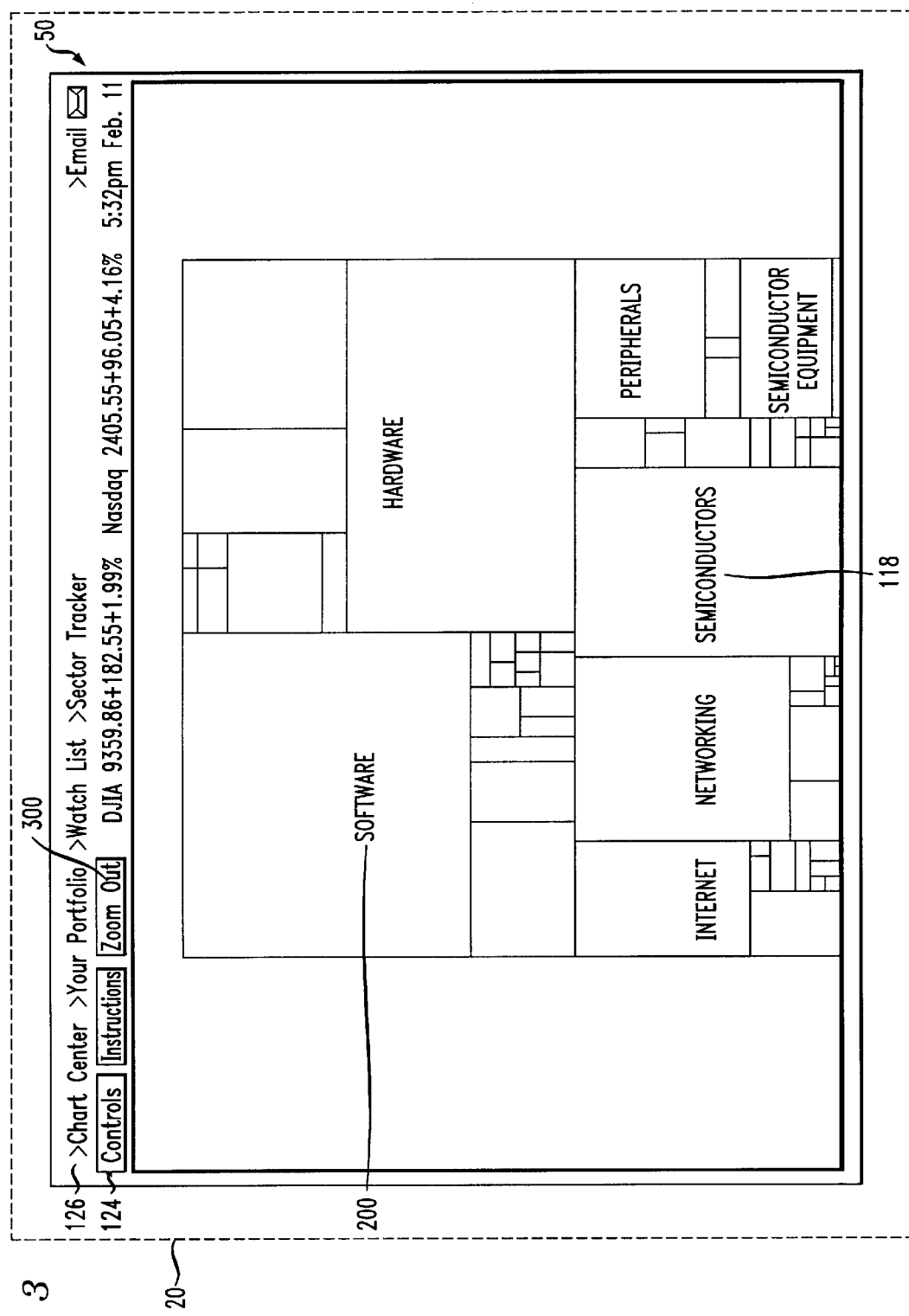
FIG. 3 illustrates a sector map view of the computer interface of FIG. 1b, according to one embodiment of the present invention.

With reference to FIG. 3, the Technology sector is shown enlarged and occupying the entire interface, according to one embodiment of the invention, referred to as a sector map view. As described above, one way of zooming into a desired sector is by selecting the appropriate option on expanded display 204 (FIG. 2b). Thus, the Technology sector, as shown in FIG. 3, may appear, for example, by a user selecting 'Sector Map: Technology' from the expanded display. It is understood that in another embodiment there may be other methods for manipulating the interface, such as by having a menu structure on menu interface bar 126. As with FIG. 2b, here too pop-up display 202 and expanded display 204 may be used for further manipulation of the display or viewing of information.

Figure 4:
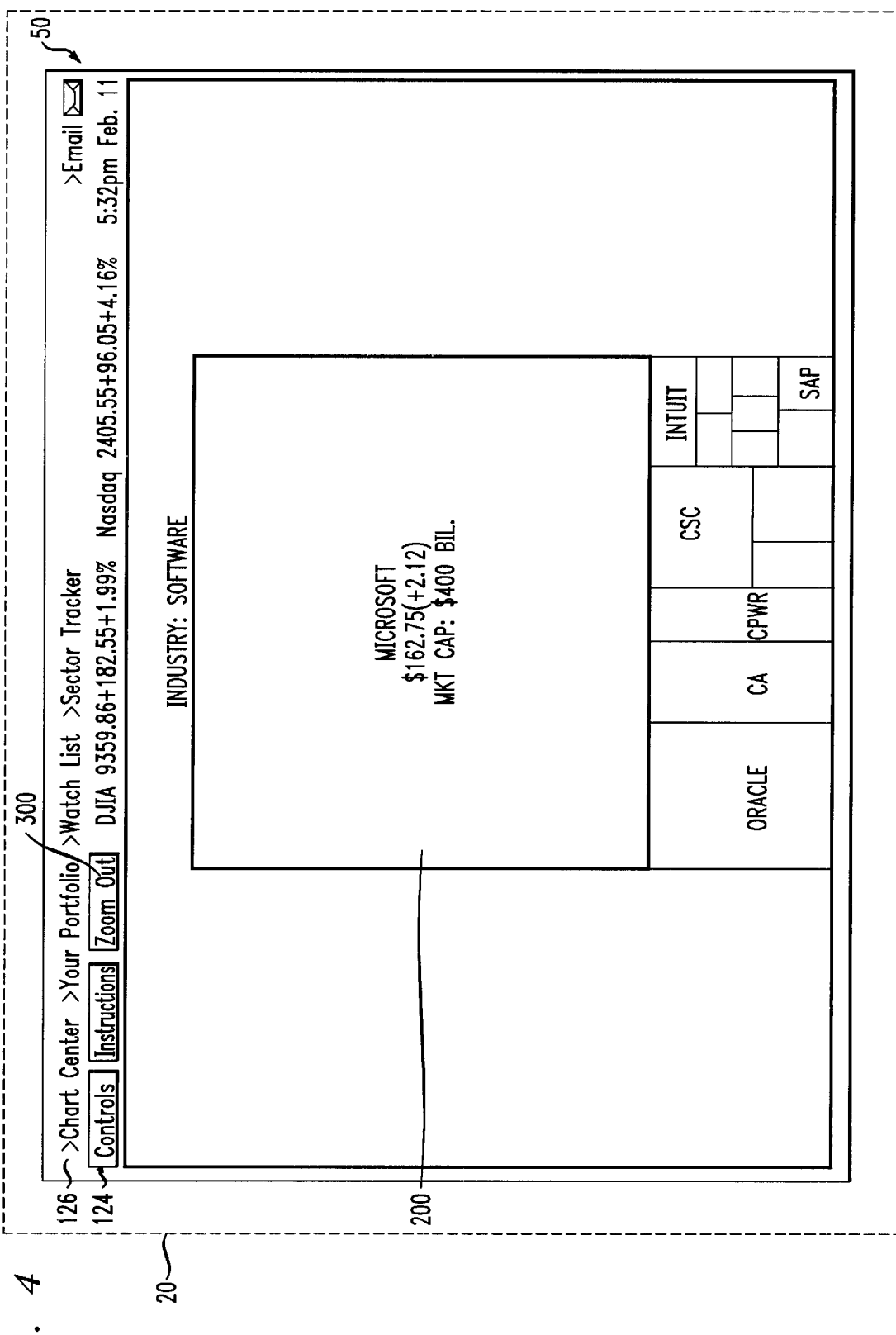
FIG. 4 illustrates an industry map view of the computer interface of FIG. 1b, according to one embodiment of the present invention.

Similarly, with reference to FIG. 4, the software industry is shown enlarged and occupying the entire interface, according to one embodiment of the invention, referred to as an industry map view. One way of selecting this view may be via expanded display 204 (FIG. 2b) and more particularly via 'Industry Map: Software' command 208 on the expanded display of FIG. 2b. Here, region 200 is enlarged to a sufficient degree so that data can be displayed without having to select a particular region. Specifically, the name, Microsoft, is listed, along with its latest stock price, change in stock price and market capitalization. Several other companies in this industry view may be seen as well, such as Oracle, Intuit, SAP and portions of other companies. Advantageously, the user still has the option of selecting any visible region within an industry map to retrieve the more detailed displays 202 and 204, as explained with reference to FIG. 2b.

Thus, according to one embodiment of the invention there are three types of display views. FIGS. 2a and 2b correspond to a market map display, wherein all the display sectors, corresponding to all financial sectors, are displayed. FIG. 3 corresponds to a sector map display, wherein one display sector is shown, displaying all industries and companies from one financial sector. Lastly, FIG. 4 corresponds to an industry map display, which shows all companies from one industry.

Again, it is noted that the interface, as described herein, is only one embodiment of the present invention and is not limited as such. For example, individual regions may display data such as company name and stock price, as detailed above, on all views, not only the industry view. Also, the displayed data may list different information, such as market volume or its price/earnings (P/E) ratio. In yet another embodiment, the user may specifically customize the particular data and font size that is displayed, among other things.

Figure 1C:
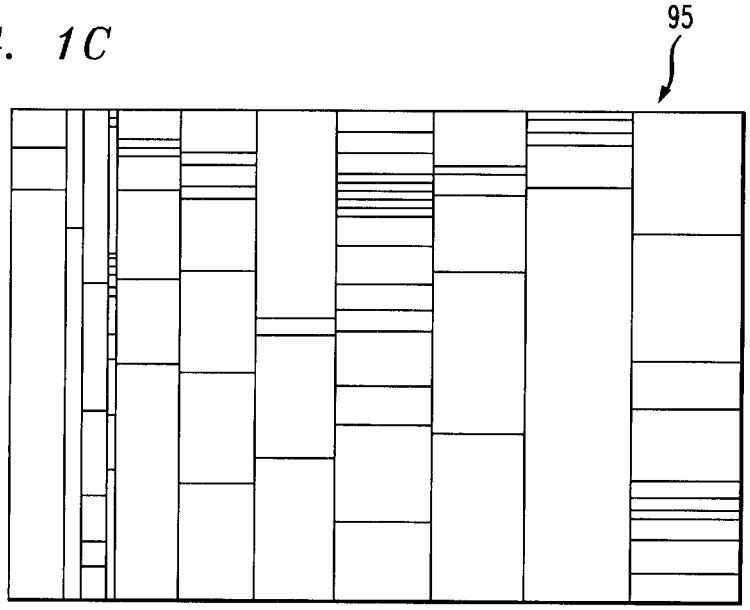
FIG. 1c illustrates a prior art treemap structure with a slice-and-dice layout.

As mentioned above, each of FIGS. 1–4 comprises button bar 124 and menu interface bar 126. When the view of the interface is an enlargement of a particular sector or industry, as shown in FIGS. 3 and 4, button bar 124 displays a 'zoom out' control 300. The user may select this control, by moving a mouse pointer over the desired area and clicking a mouse button, for example. Once selected, the interface responds by zooming out of the present view into a larger view. For example, an industry view may zoom out to its parent sector view and a sector view may zoom out to a main view, as shown in FIG. 1. Similarly, other controls are provided on button bar 124 and menu interface 126 to facilitate any necessary tasks.

Figure 5:
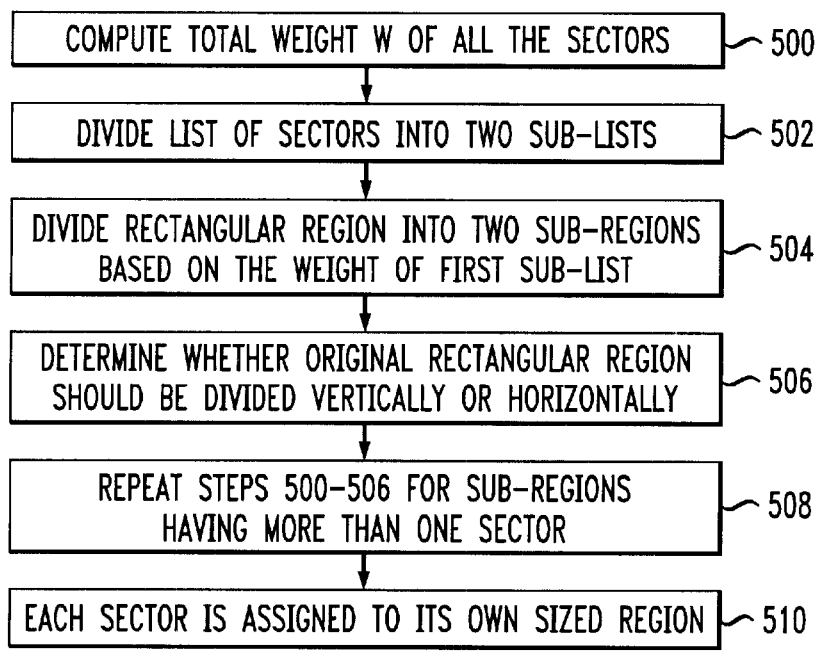
FIG. 5 is a flow diagram, which illustrates the sequence of operation of the method of the initial layout stage, according to one embodiment of the present invention.

The process or method by which the interface system of this embodiment generates the appropriate rectangular region sizes and positions for display on the computer interface is now explained in more detail. References are made to FIGS. 5 and 6 and to FIGS. 7a–e and 8a–d, which respectively illustrate flow diagrams of the different steps that are taken in this method and graphical representations of the different steps that are taken in this method, according to one embodiment of the present invention. The method of this embodiment operates via two stages: sizing and shaping the rectangles at steps 500–510, also referred to as the initial layout stage, and positioning the sized rectangles at 600–604, also referred to as the optimization stage. For each of the views discussed in reference with FIGS. 2–4, the system performs both stages respectively.

As a preliminary, the underlying objectives of this method are briefly detailed. In essence, simply sizing a rectangular space based on the appropriate criteria, such as market capitalization or volume, would not be sufficient. First, there may be a minority of companies that have significantly larger capitalization or volume compared to the remaining companies that are to be displayed. For example, there may be one company with a market capitalization of $130 billion, and at the same time there may be ten other companies that are to be displayed in the same sector each having a market capitalization under $50 million.

Without the unique method of one embodiment of this invention, the significantly larger company may be potentially sized to occupy most of the screen, both dwarfing other companies and impairing the benefits of the visual interface to the user. Therefore, a method for intelligently apportioning regions so that each company is satisfactorily displayed is necessary.

Second, even if the apportionment is perfectly calculated the shape and position of individual regions present two other difficulties. It is most desirable to have each region shaped in a visually appealing manner and to have similarly sized or similarly related regions adjacent to each other. Thus, awkwardly shaped regions, such as long narrow rectangles should be avoided as well as randomly positioned regions, which potentially confuse the user and damage part of the look and value of the interface. The method of creating such regions, according to one embodiment, is detailed below.

Given a rectangular space, such as the display area of display screen 20, and a list of display sectors, such as financial sectors 102–122, interface system 50 is initiated with the aim of dividing the display area into multiple rectangular display sectors, representing corresponding financial sectors. First, the initial layout stage is employed so that the multiple rectangular sectors are sized appropriately.

Initially, interface system 50 creates a sorted list of the provided financial sectors. The list may also contain any accompanying information, such as the individual companies and industries belonging to each of the sectors. In this embodiment, the sectors are sorted according to a predetermined criterion, such as market capitalization, which will be the basis for determining the physical size of each region. Thereafter, the total weight W of all the sectors is calculated. Here, weight refers to the sum total market capitalization for all sectors. As explained above, the size of a region according to one embodiment graphically corresponds to its market capitalization. Thus, a larger region should represent a sector with a larger total capitalization. This concludes the initialization process, corresponding to step 500 on FIG. 5.

Thereafter, at step 502, the sorted list of sectors is divided into two sub-lists, wherein the first list is generated by taking as many of the largest sectors that have a total weight not exceeding for example, 50% of weight W. The second list comprises all remaining sectors, although the invention is not limited in scope in that respect. For example, it is noted that the total weight corresponding to the first list may be set to a specific percentage, other than 50%, of the total weight of all the sectors in the sector list.

For example, with reference to FIGS. 7a–7e, if the originally provided sectors comprise sectors S1, S2, S3 and S4 each having a respective weight of 4, 2, 1 and 3 the original sector list would be created and divided into two sub-lists as follows. First, the original list is sorted, which generates the four sorted sectors S1, S4, 52 and S3 having respective weights 4, 3, 2 and 1. In FIG. 7a, a sector sorted list 700 is shown, according to one embodiment of the invention, having the aforementioned values. Second, the sectors are individually examined from the sorted list. The total weight W here is 10 (4+2+1+3), Thus, all largest sectors that do not exceed a weight of 5 (50% of 10) need to be selected for the first list. The first sector S1 has a weight of 4 so it is selected, as it is less than the maximum allowed weight of 5.

It is noted that the first sector is always selected, regardless of weight, since there must be at least one sector in each of the two lists. In the situation where the first sector is greater than 50% of weight W, the method of this invention can operate in one of several manners. According to one embodiment the method of this invention preferably allows the largest sector of the list to occupy its corresponding proportional size on the display screen even if that size exceeds the 50% limitation. According to another embodiment the method considers, for calculation purposes, as if the largest sector is weighed exactly 50% of weight W. This, in effect, reduces the significance of larger regions on the display in order to avoid visibility problems with smaller regions.

The second sector S4 has a weight of 3 so it is not selected, since the total weight of the first list would be 7 (4+3), which exceeds the maximum allowed weight W of 5. Therefore, the sorted list is now broken into two sub-lists, the first list comprising sector S1 (with a weight of 4) and the second list comprising the remaining sectors, namely sectors S4, S2 and S3 (with respective weights 3, 2 and 1).

At step 504, the rectangular region, for example display screen 20 (FIG. 2) is taken and broken into two sub-regions, one region for each of the two sector lists. The rectangular region is divided based on the weight of the first list. For example, in the situation above, since the first sector list has a total weight of 4, which is 40% of the total weight W of 10, it would be assigned a sub-region equaling 40% of the original rectangular region. The second list would be assigned the other remaining sub-region, equaling 60% of the original rectangular region. Illustratively, FIG. 7b STET original rectangular region 702 being divided into rectangular regions 704 and 706 as shown in FIG. 7c, according to one embodiment of the present invention.

Notably, according to the embodiment that resizes the proportionate area of a large sector on the display screen, if the first sector list comprises a sector weighing more than 50% of the total weight W, the rectangular sector would be divided into two equally sized sub-regions. Thus, the first list would be assigned 50% of the original rectangular region, as well as the second list. This prevents a proportionately larger sector from occupying too much space and dwarfing the size of the remaining sectors. It should be noted that the limit of 50% is a predetermined percentage and may be modified as either a higher or lower percentage limit depending on the desired appearance of the display. According to another embodiment, the larger region is sized proportionately to its weight, even after exceeding the 50% limit, in order to preserve a more numerically accurate structure.

At step 506, the method of this embodiment determines in what manner to create the two sub-regions. Specifically, the method calculates whether it should divide the original rectangular region vertically, with a vertical line, or horizontally, with a horizontal line. Basically, the line that provides the lowest aspect ratios for both regions is chosen. The aspect ratio of a rectangular region refers to the ratio of length over the width, For example, a rectangle having a length of 4 and a width of 1, or vice versa, would have an aspect ratio of 4:1. The objective of this method is to break up the rectangular region in a manner that generates the lowest aspect ratio. Ideally, the sub-region should be shaped as close to a square as possible, thus having the lowest possible aspect ratio of 1:1. This process of continuously dividing the sectors into two groups of low aspect ratio regions provides for a more visually appealing and useful display.

Thereafter, at step 508, for any sub-region having more than one sector the above steps 500–506 are repeated. Specifically, a new sorted sector list is generated and the total weight W is recalculated based on the sectors in the present sub-region. Then, the sector list is broken into two sub-lists based on the aforementioned criteria and the present region is further divided into two sub-regions, each being assigned to one of the two sub-lists as detailed above.

Once every sector is assigned to its own sized region, at step 510, the first stage is complete. With reference to FIG. 7c, rectangular region 702 of FIG. 7b is divided to regions 704 and 706. Thereafter, region 706 is further divided to regions 710 and 712 in as shown in FIG. 7d. Thereafter, region 712 is divided to regions 714 and 716 as shown in FIG. 7e.

Now, stage two, the optimization stage, is employed so that the sized regions can be rearranged or positioned in their proper locations. It is noted that there is more than one 'proper' location, as the positioning of this stage is not limited to any one specific method. Basically, the method of stage two is primarily configured to eliminate the random positioning of the regions so as to improve the visual appearance and to prevent potential user confusion. Thus, the optimization method may be used to arrange the regions by a mathematical function of various characteristics of displayed regions, such as for example, the size of a region, performance of underlying entity represented by the region, volume of the underlying entity represented by the region, etc.

Accordingly, the optimization arrangement provides a further enhancement to the graphical view since the user may also obtain information by simply noting the arrangement or positions of the regions. For example, one optimization method positions regions by performance, thus enabling users to determine the relative performance of a company based on its location on the interface. Aside for the inherent usefulness, this method provides for a more appealing visual display by not randomly dispersing the regions. The optimization method is employed as follows.

System 50 divides the display screen based on multiple levels of organization. For example, on one level system 50 divides the display screen into financial sectors so that every region represents a corresponding financial sector. On another level, system 50 divides each financial sector into its industry components so that each region represents a corresponding industry. Finally, on still another level system 50 divides each industry region into its company components so that each region represents a corresponding company. The optimization process in accordance with one embodiment of the invention selects a desired layout for every level of organization. This may be accomplished as follows.

Figure 6:
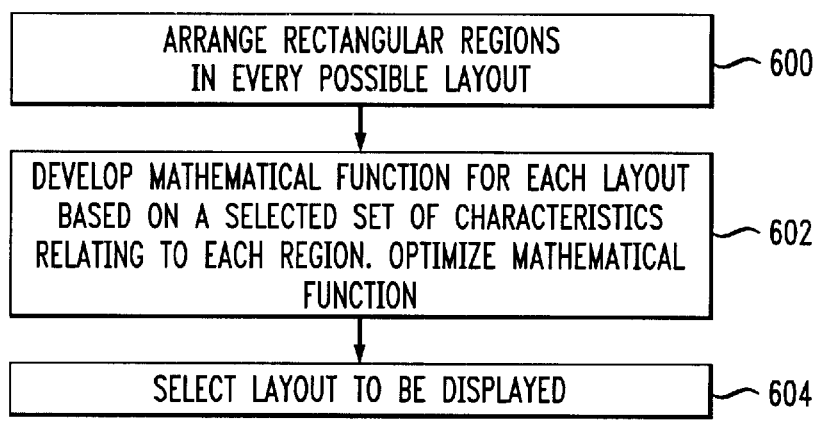
FIG. 6 is a flow diagram, which illustrates the sequence of operation of the method of the optimization stage, according to one embodiment of the present invention.

At step 600, shown on FIG. 6, the rectangular regions generated in stage one are taken and arranged in every possible layout. This is purely a mechanical process where every combination of positioning of the various regions is generated. This is analogous to a jigsaw puzzle, wherein each piece, or rectangular region, is placed in every possible location to see where it fits best. As an example, with reference to FIGS. 8a–8d, rectangular layouts 800–806 illustrate a portion of this process, according to one embodiment of the present invention, wherein multiple regions, based on the regions from FIG. 7e, are rearranged as different layouts. According to another embodiment, instead of using a brute force method to find an optimum layout, various sampling algorithms are employed to more efficiently process the optimization stage. For example, such algorithms may include dynamic programming, simulated annealing, and genetic algorithms.

For each of the layouts generated at step 600, a mathematical function is calculated at step 602 based on a selected set of characteristics relating to each region. This mathematical function is then optimized to determine the most desired layout among the corresponding group of possible layouts. This calculated number is then used to determine the desirability of the corresponding layout. As described above, the optimization of this stage is not limited to a particular method.

An example of a mathematical function in accordance with one embodiment of the invention is the differences between one or more metrics of various entities represented by the regions based on their selected lay out. A metric in this context refers to a quantifiable characteristic of an entity represented by a region on the display screen. For example, for a company represented by a region, typical metrics may include market capitalization, price increase or price decrease over a given period, price/earning ratio or any other desired metric. The various entities considered by the mathematical function may include each region and all the other regions adjacent to it in each one of the selected layouts. In the alternative a separate function governs the selection of the regions whose metrics are part of the mathematical function. As such, the selected region may not be adjacent to each other. Some examples of the mathematical functions governing an optimized layout are explained below.

According to one embodiment, the variable used by the mathematical function to optimize the layout is a region value. As such, first a region value is assigned to every region or company in the layout. This region value corresponds to a numerical or other comparable value that is derived from the performance of the respective region. For example, when company regions are being divided, a company having a stock price appreciation of 36.3% for the prior twelve months may be assigned a value of 36.3. It is noted that one reason for positioning regions according to their performance is so that similarly performing companies will be adjacent to each other, allowing, for example, stock market trends to be spotted more easily. Accordingly, in one embodiment, the performance value that is used in this method is identical to the performance value used to determine the color of each region, as detailed above. This provides an optimization with contiguous regions of similar colors.

In an alternative embodiment, if the user wishes to employ the optimization method using region size or any other criteria as opposed to performance, the corresponding value for each region is simply replaced with the desired value.

Second, for every region in the layout a mathematical function in accordance with one embodiment is defined as the region variance. The region variance is calculated by computing the difference between each region value and the region values of all neighboring regions. The region variance calculation is done for every region in the layout and then summed to derive a layout variance number. Thereafter, the layout having the lowest layout variance number is chosen as the desired layout. In other words, the layout having the most similar regions adjacent to each other is selected.

Thus, for example, with continued reference to sectors S1–S4 from FIGS. 7 and 8, the region variance number for sector S1 is calculated as follows. Assuming sector S1 has a region value of 25 and it has two neighboring regions, S2 and S4, having respective region values of 15 and 20, then the region variance number for sector S1 is 15 ((25−15)+(25−20)).

The region variance calculation is done for every region in the layout and then summed. Therefore, if there are, for example, four regions in the layout, each having a respective region variance number of 15, 12, 8 and 5, the layout variance number for that layout would be 40 (15+12+8+5).

At step 604, the layout having the lowest layout variance number is chosen as the desired layout, so that the layout having the most similar regions adjacent to each other is selected.

In another embodiment of the invention the mathematical function is defined as the sum of distances between adjacent regions. Preferably, the distance is defined as the square root of the sum of the squares of differences in price change of an entity represented by a region over some set of time intervals. Thereafter, the layout having the lowest sum of distances between adjacent regions is chosen as the desired layout.

Another method of employing the optimization stage using, for example, stock performance as a criterion is by calculating a 'similarity measure.' According to one embodiment, every region is assigned thirty-six values, corresponding to the percentage change in stock price for each month of the past three years. These thirty-six values represent a point in a 36-dimensional space. Then, the distance between any two regions may be calculated as their Euclidean distance in this 36-dimensional space. Similar to the method above, the layout having the lowest sum of Euclidean distances is selected.

The computer interface can now be displayed, as shown, for example, in FIG. 1. This concludes stage two and the method according to this embodiment of the invention.

These two stages, the initial layout stage and the optimization stage are repeatedly applied to divide financial sectors, industry regions within each financial sector, and company regions within each industry region.

Figure 9:
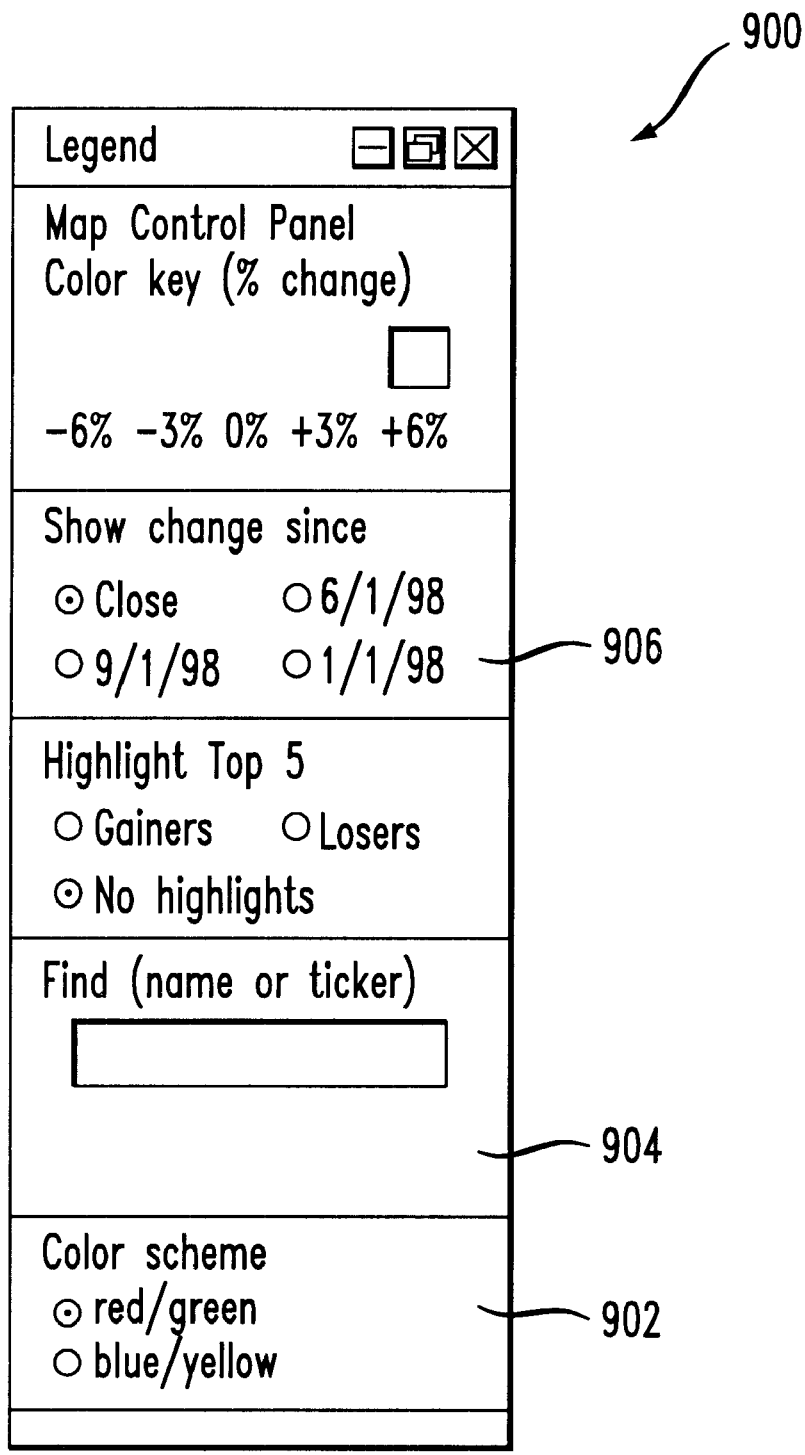
FIG. 9 is a view of a legend control, according to one embodiment of the present invention.

FIG. 9 illustrates one optional feature, a legend display 900. Legend display 900 is useful for controlling the criteria and visual indications of interface system 50. For example, the user may adjust, the color indication of the sectors from red and green to blue and yellow by modifying the color scheme control 902. Such a color change is useful for those with red/green color blindness. Similarly, the user may modify the 'show change since' control 906 in order to analyze the performance of a stock over varying selected periods of time. Find control 904 enables the user to automatically highlight a particular stock or company by typing its name or stock ticker symbol without having to visually locate it on the interface.

FIG. 10 illustrates a second optional feature to the financial application of this embodiment, namely stock snapshot view 1000. Expanded display 204 (FIG. 2b) may, for example, have an option that upon selection generates stock snapshot view 1000 for a more detailed analysis of a particular company.

It is to be understood that the present invention is not limited to the embodiments as described hereinabove. In an alternative embodiment the computer interface may be configured for use in areas other than the financial industry. These include, for example, retail, medical, education, employment, budget committees, etc. Furthermore, the computer application of this invention can be designed on an abstract level to allow customization by the user for any desired use. Accordingly, the system could be designed to accept input from the user for various criteria. Such criteria may include the type and quantity of sectors (referred to as financial sectors in the abovementioned embodiment), the type and quantity of units (referred to as industries in the above-mentioned embodiment), the objects corresponding with each region (referred to as individual companies or corporations in the above-mentioned embodiment), etc. Several examples of such a system are detailed below.

With respect to Internet commerce, the software application of this invention can be employed to provide Internet users or customers with a better visualization of the products they are seeking to purchase. For example, an online bookstore, such as Amazon.com or BarnesandNoble.com, could use the software interface, configured according to one embodiment of this invention, to display books by category and number of books sold so that users may gauge the popularity of a books as compared to other similar books.

For example, each sector on the interface of this embodiment may correspond to a different literary category. These may comprise fiction, non-fiction, new release, young adult, science fiction and computers. Further, within each sector or literary category there may be further units or subcategories, similar to the use of industry units in the aforementioned financial software embodiment. Here, example units or sub-categories in the computer category may be Internet, programming, Web design, graphics, databases, etc.

The rectangular regions belonging to each sector or unit could correspond to individual book titles. Each book title would be sized differently. For example, based on the number of books sold at the Internet site or by the publisher. Furthermore, color indications, such as green, red and black can be used to respectively signal an upward, downward or neutral trend in the number of books sold over a particular time.

Thus, a very large region would signal to a customer that a particular book is popular. On the other hand, if the region is colored red it may further signal that the book is not selling as many copies as it used to, perhaps because it is dated. Similarly, a small but bright green region may signal a new and upcoming book that has not sold as many copies due to recent publication. Naturally, the various visual indications may be modified to suit a particular need or demand. In one embodiment, the user may chose to exclusively display on the Interface all books that are in his or her shopping cart. This provides for greater customization of the interface without the hassle of otherwise creating a custom list of books to be shown.

According to another embodiment that relates to Internet commerce, the software application of this invention can be used to compare products on a computer retail or auction site, such as onsale.com, ubid.com, cdw.com and insight.com. For example, different product categories can be assigned to distinct sectors and individual regions could each correspond to a unique product. Similarly, the size of a region could correspond with quantity sold or price of the particular product.

Moreover, rather than having the region displaying one color indicating a positive or negative change in sales, popularity or stock movement, as with the embodiments above, here there may be multiple colors displayed, each indicating a different feature or rating. For example, each region can be divided into two or more parts, each part having a different visual indication. One part may, for example, show purple for a relatively high priced product or yellow for a relatively low priced product. Another part may have a status bar that indicates the speed, performance or reliability of a product based on consumer responses or other tests. Yet another part may provide an indication as to what features the particular product has. For more complicated graphical displays, a key may be positioned on the interface to define the relevant terminology or use of colors, etc.

Yet another embodiment for use on the Internet may be an interface system for web site maintenance. Such an embodiment may, for example, assign individual sectors to one of a plurality of web sites or different categories or portions of one web site, etc. Each region can refer to a unique web page, whereby the size of the region reflects the number of 'hits' or access volume. Furthermore, the color of each region can correspond to a change in usage or hit rate. This embodiment is useful for monitoring the popularity of a web site and individual web pages, among other things.

Of course, the software application of this invention is not limited to use on the Internet. In yet another embodiment, a hospital may use the software interface of this invention to visualize the progress and condition of multiple patients. For example, various conditions ranging from cancer to routine surgery can be assigned to distinct sectors. Furthermore, within each sector there may be several units or sub-categories isolating different types of cancer or other conditions. Each region can refer to a unique patient, whereby the size of the region can reflect the seriousness of his or her condition and the color can correspond with a positive or negative change in prognosis.

There are many additional embodiments that can provide users in their respective fields with a useful visual interface. Briefly, other embodiments may include the following:

One embodiment may be configured to gauge the performance and/or behavior of students by assigning a larger region to better performing or behaved students and using color to indicate any changes. Further, sectors-may be used to divide students by class or by subject, etc.

Another embodiment could be implemented to monitor a corporate budget. Individual sectors may correspond to departments or groups and region sizes and color could respectively represent the size of a budget and the increase or decrease in recent spending.

Employers may also configure the interface of this invention to monitor employee performance and hours worked. Sectors could divide employees by profession or area of work. Also, region size and color could respectively represent the number of hours worked for a predetermined period of time and recent increases or decreases in performance.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. In a computer interface system for providing a visual display of a financial market, said visual display comprising:
   a plurality of display sectors, each display sector representing a financial sector, wherein size of each display sector corresponds to a specified characteristic of said financial sector;
   a plurality of company regions disposed within each display sector, each company region representing a company, each of said company regions associated with a financial sector represented by said display sector, wherein the size of each company region corresponds to a specified characteristic of said company region
   wherein each company region is represented by a color corresponding to a characteristic of a corresponding company represented by each one of said company regions; and
   means for measuring said company characteristic within a specifiable period of time selected by a user of said computer interface system.

2. A visual display in accordance with claim 1 wherein each of said display sectors is divided into a plurality of industry regions, wherein each industry region corresponds to a financial sector represented by each of said display sectors, and each of said industry regions contains a plurality of corresponding one of said company regions associated with each of said industry regions.

3. A visual display in accordance with claim 2 wherein the size of each of said company regions corresponds to market capitalization of a corresponding company represented by each of said company regions.

4. A visual display in accordance with claim 3 wherein the size of each display sector corresponds to total market capitalization of a corresponding financial sector represented by each of said display sectors.

5. A visual display in accordance with claim 4 wherein additional information about each of said companies represented by a company region is displayed in response to movement of a cursor over said company region.

6. A visual display in accordance with claim 5 wherein said additional information comprises the name of said company represented by a company region and performance of said company within a specifiable period of time as selected by a user of said computer interface system.

7. A visual display in accordance with claim 5 wherein further information about each of said companies represented by a company region is displayed in response to a command provided by a user of said computer interface system.

8. A visual display in accordance with claim 7 wherein said information comprises an option to display on said display screen only a display sector wherein said company region belongs and an option to display on said display screen only an industry region wherein said company region belongs.

9. A visual display in accordance with claim 1 wherein said color is a function of market performance of a company represented by each one of said company regions.

10. A visual display in accordance with claim 9 wherein said market performance is the price per share of a company represented by each one of said company regions.

11. A visual display in accordance with claim 9 wherein intensity of said color depends on value of said performance of a company represented by each one of said company regions.

12. A computer interface system for providing a visual display of a financial market on a display screen, said visual display comprising:
   a plurality of display sectors each of said display sectors representing a corresponding financial sector, each of said display sectors further having a size corresponding to total market capitalization of said corresponding financial sector, and wherein total size of said display sectors corresponds to total size of said display screen;
   a plurality of company regions within each of said display sectors, each of said company regions representing a company that belongs to a financial sector represented by each of said display sectors, wherein said display screen is divided by said display sectors such that as many of largest display sectors as can be fitted in one area of said display screen are located in said area having a size less than a specifiable percentage of total size of said display screen; and
   said company regions within each display sector are further positioned on said display screen such that layouts providing a smaller total difference of values representing company characteristics between neighboring company regions are selected over layouts providing a larger total difference of values between neighboring company regions.

13. A visual display in accordance with claim 12 wherein said specifiable percentage is approximately 50%.

14. A visual display in accordance with claim 13 wherein financial sectors having a size larger than said 50% of total size of said display screen occupy half of said display screen.

15. A visual display in accordance with claim 12 wherein each display sector is divided by either one of a vertical line and a horizontal line such that rectangles remaining after each division have lowest possible aspect ratio.

16. A visual display in accordance with claim 12 wherein said company regions within each display sector are further positioned on said display screen such that layouts providing a smaller total sum of distances between neighboring company regions are selected over layouts providing a larger total sum of distances between said neighboring company regions.

17. The visual display from the computer interface of claim 16, wherein said colors for each of said regions are green, red and black and said visual indication is a positive, negative and neutral change in stock price.

18. The visual display from the computer interface system of claim 12, further comprising a plurality of industry regions, each of said industry regions corresponding to a financial industry such that said regions are further associated with one of said display industries within said display sectors.

19. The visual display from the computer interface of claim 12, further comprising a menu interface and a button bar for providing a means to manipulate and display information.

20. The visual display from the computer interface of claim 12, further comprising a pop up display so that relevant data for individual regions may be displayed, said pop up display appearing when one of said regions is selected.

21. The visual display from the computer interface of claim 20, further comprising an expanded display so that additional data and user options may be provided.

22. The visual display from the computer interface of claim 12, wherein said sizing and displaying said regions comprises sizing said regions so as to reduce the frequency of rectangles having high aspect ratios.

23. The visual display from the computer interface of claim 12, further comprising a zoom view of each of said display sectors.

24. The visual display from the computer interface of claim 12 further comprising a zoom view of each of said industires.

25. The visual display from the computer interface of claim 12, wherein said difference between neighboring company regions corresponds to performance of stock price.

26. The visual display from the computer interface of claim 12, wherein said sized regions are re-sized at predetermined intervals corresponding to a change in financial data of said regions.

27. The visual display from the computer interface of claim 12, wherein said regions and said display sectors are customizable via user input.

28. The visual display from the computer interface of claim 12, wherein said company regions within each display sector are further positioned on said display screen according to a mathematical function employing variables comprising metrics of companies represented by said company regions.

29. The visual display from the computer interface of claim 28, wherein said mathematical function is employed to minimize the sum of the distances between adjacent companies.

30. The visual display from the computer interface of claim 28, wherein said metric is a region value assigned to each region of a layout and said mathematical function is employed to derive and sum a plurality of region variances for every region in a layout so as to derive a layout variance number, wherein the layout having the lowest layout variance number is selected.

31. A method of generating regions for display on a display screen of a computer interface system comprising the steps of:
- creating a plurality of said regions, one for each of a plurality of objects;
- associating a weight to each of said regions based on relevant characteristic data from said objects;
- sizing and displaying said regions on said display screen according to an initial layout such that as many of the largest regions as can be fitted in one area of said display screen are located in said area having a size less than a specifiable percentage of total size of said display screen and
- positioning said regions according to an optimization method, such that layouts providing a smaller total difference of value representing said characteristics between neighboring regions are selected over layouts providing a larger total difference of value between neighboring regions.

32. The method of claim 31, wherein said objects are companies.

33. The method of claim 31, wherein said objects are web pages.

34. The method of claim 31, further comprising the step of assigning each of said regions to one of a plurality of display sectors.

35. The method of claim 31, wherein said step of sizing and displaying said regions comprises the step of dividing each display sector by either one of a vertical line and a horizontal line such that rectangles remaining after each division have lowest possible aspect ratio.

36. The method of claim 31, further comprising the step of providing a button bar in order to manipulate and display information to one or more users.

37. In a computer interface system for providing a visual display of an Internet software application on a display screen, said visual display comprising:
- a plurality of display sectors, each of said display sectors having a size corresponding to a specified characteristic of said display sectors;
- a plurality of regions within each of said display sectors, each of said regions representing an object that belongs to its corresponding display sector, wherein said display screen is divided by said display sectors such that as many of largest display sectors as can be fitted in one area of said display screen are located in said area having a size less than a specifiable percentage of total size of said display screen and
- means for measuring said characteristic within a specifiable period of time selected by a user of said computer interface system.

38. The computer interface system of claim 37, wherein said object is one of consumer products, web pages, companies, books, employees and patients.

39. The computer interface system of claim 37, wherein said display sectors represent a corresponding one of product categories, financial sectors, book categories and patient conditions.

40. In a computer interface for providing a visual display of a web site maintenance software application on a display screen, said visual display comprising:
- plurality of display sectors each of said display sectors representing a corresponding web site, each of said display sectors further having a size corresponding to total hit rate of said corresponding web site, and wherein total size of said display sectors corresponds to total size of said display screen;
- a plurality of web page regions within each of said display sectors, each of said web page regions representing a web page that belongs to a web site represented by each of said display sectors, wherein said display screen is divided by said display sectors such that as many of largest display sectors as can be fitted in one area of said display screen are located in said area having a size less than a specifiable percentage of total size of said display screen; and
- means for measuring said hit rate within a specifiable period of time selected by a user of said computer interface system.

* * * * *